(12) United States Patent
Zhang

(10) Patent No.: US 7,694,039 B2
(45) Date of Patent: Apr. 6, 2010

(54) DATA TRANSMISSION INTERFACE SYSTEM AND METHOD FOR ELECTRONIC COMPONENT

(75) Inventor: Jun Zhang, Shenzhen (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1107 days.

(21) Appl. No.: 11/307,212

(22) Filed: Jan. 26, 2006

(65) Prior Publication Data

US 2007/0026716 A1 Feb. 1, 2007

(30) Foreign Application Priority Data

Jul. 29, 2005 (CN) .................. 2005 1 0036282

(51) Int. Cl.
*G06G 13/00* (2006.01)
*G06F 13/00* (2006.01)

(52) U.S. Cl. .......................... 710/33; 710/65; 710/105

(58) Field of Classification Search ............ 710/33–35, 710/65–71, 105–106; 386/39
See application file for complete search history.

(56) References Cited

U.S. PATENT DOCUMENTS

| 3,889,236 | A | 6/1975 | Herger et al. |
| 4,689,740 | A | 8/1987 | Moelands et al. |
| 5,023,727 | A * | 6/1991 | Boyd et al. ................ 386/39 |
| 6,298,066 | B1 | 10/2001 | Wettroth et al. |
| 6,351,489 | B1 | 2/2002 | Tetzlaff |
| 6,748,361 | B1 * | 6/2004 | Comerford et al. .......... 704/275 |
| 7,260,151 | B2 * | 8/2007 | Cohen et al. ................ 375/242 |
| 2005/0077976 | A1 * | 4/2005 | Cohen et al. ................ 332/112 |
| 2007/0026716 | A1 * | 2/2007 | Zhang ........................ 439/260 |

FOREIGN PATENT DOCUMENTS

CN 1148299 A 4/1997

OTHER PUBLICATIONS

Ping Wang, Xi Huang, Tu-Song Wei, Method for Designing a Device Controlling Module of a Remote Intelligent Controlling System, Electronic Technology, 2004, pp. 4-7, vol. 11, China Academic Journal Electronic Publishing House, China.

* cited by examiner

*Primary Examiner*—Christopher B Shin
(74) *Attorney, Agent, or Firm*—Winston Hsu

(57) ABSTRACT

A data transmission interface system includes a first electronic component having a first pin, a second electronic component having a second pin electronically connected with the first pin via a wire. The first electronic component includes an encoding module for converting a command into a pulse code. The second electronic component includes a decoding module for converting the pulse code into the command. The first pin is capable of switching between a first state and a second state. The second pin is in the same state as the first pin. Switch of the first pin from the first state to the second state triggers a beginning of data transmission between the first electronic component and the second electronic component. A related method is also provided.

18 Claims, 6 Drawing Sheets

DATA TRANSMISSION INTERFACE SYSTEM AND METHOD FOR ELECTRONIC COMPONENT

FIELD OF THE INVENTION

This invention relates to a data transmission interface system and method and, more particularly, to a data transmission interface system and method using a single wire.

DESCRIPTION OF RELATED ART

Electronic components, including micro control units (MCUs), central processing units (CPUs), temperature sensors, voltage sensors, display units, communicate with each other so as to perform some particular tasks. For example, an MCU communicates with a display unit to control working states of the display unit. A master integrated circuit (IC) communicates with a slave IC to control the slave IC to perform a particular task. A traditional data transmission interface system, such as an inter-integrated circuit ($I^2C$), a serial peripheral interface (SPI), each requires at least two wires to interconnect electronic components. For example, the $I^2C$ interface system requires two wires, one wire serving as a data line, the other wire serving as a clock line. The SPI interface system requires three wires. A first wire is used for transmitting data in a first direction, a second wire is used for transmitting data in a second direction opposite to the first direction, and a third wire serves as a clock line. Each wire is connected to a respective pin of an electronic component. Thus, the traditional interface systems require that the electronic components have at least two pins for data transmission.

An electronic component often needs to communicate with more than one other electronic component. For example, a micro control unit (MCU) for a disc player not only needs to communicate with a servo and decode IC to control work states of the servo and decode IC, but also needs to communicate with a display unit to control display states of the display unit, and to communicate with an input terminal to receive input signals. However, pins of some electronic components, especially for compact electronic components, are limited.

Therefore, a data transmission interface system using reduced wires is desired.

SUMMARY OF INVENTION

A data transmission interface system includes a first electronic component having a first pin, a second electronic component having a second pin, and a wire for connecting the first pin and the second pin. The first electronic component includes an encoding module for converting a command into a pulse code. The second electronic component includes a decoding module for converting the pulse code into the command. The first pin is capable of switching between a high level state and a low level state. The second pin is in the same state as the first pin. The first pin is switched from one of the high level state and the low level state to the other one of the high level state and the low level state thereby triggering a beginning of data transmission between the first electronic component and the second electronic component.

A data transmission interface method is provided for achieving data transmission between a first electronic component having a first pin and a second electronic component having a second pin electronically connected with the first pin via a wire. The data transmission interface method includes steps of: one of the first electronic component and the second electronic component generating a command; converting the command into a pulse code; switching the first pin from a first state to a second state; and the one of first electronic component and the second electronic component transmitting the pulse code via the wire to the other one of the first electronic component and the second electronic component.

A data transmission interface method is provided for achieving data transmission between a first electronic component having a first pin and a second electronic component having a second pin electronically connected with the first pin via a wire. The data transmission interface method includes steps of: one of the first electronic component and the second electronic component generating a command being consecutive with a last command by time sequence; determining whether the command is identical to the last command; converting the command into a pulse code consisted of a start signal, a stop signal, and a group of 32-bit binary codes, if the command is not identical to the last command; switching the first pin from a first state to a second state; transmitting the start signal and the stop signal; switching the first pin from the second state to the first state; and transmitting the group of 32-bit binary codes to the other one of the first electronic component and the second electronic component.

Other advantages and novel features will become more apparent from the following detailed description of preferred embodiments when taken in conjunction with the accompanying drawings, in which:

DETAILED DESCRIPTION

Figure 1:
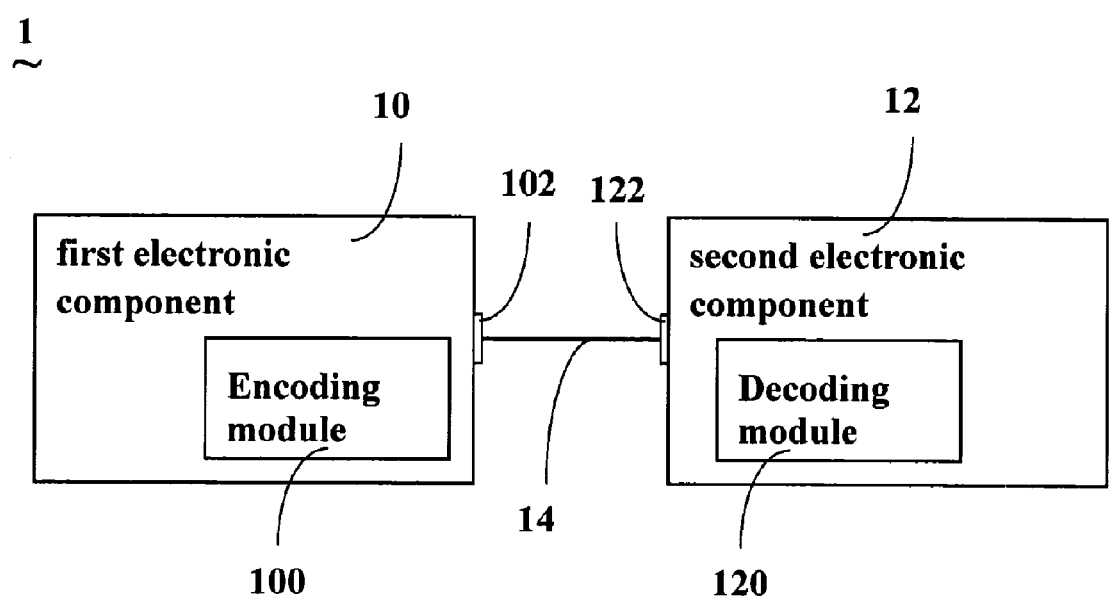
FIG. 1 is a block diagram of a data transmission interface system in accordance with a preferred embodiment.

Referring to FIG. 1, a data transmission interface system 1 includes a first electronic component 10 having a first pin 102, a second electronic component 12 having a second pin 122, and a wire 14 for interconnecting the first pin 102 and the second pin 122. The first electronic component 10 is an MCU, while the second electronic component 12 is a servo and decoder IC. In other alternative embodiments, the first electronic component 10 is one of a sensor, an MCU, a master IC, and a CPU, while the second electronic component 12 is one of the MCU, a display unit, a slave IC, and a functional IC accordingly. The first electronic component 10 generates commands to be sent to the second electronic component 12 so as to control working states of the second electronic component 12. Both the first pin 102 and the second pin 122 are capable of switching between a high level state and a low level state. The second pin 122 is kept in a same state as the first pin 102. The switching from the high level state to the low level state is utilized to trigger a beginning of data transmission between the first and second electronic components 10 and 12.

The first electronic component 10 includes an encoding module 100 for converting commands generated by the first electronic component 10 into pulse codes in a predetermined format. The second electronic component 12 includes a decoding module 120 for receiving the pulse codes and for converting the pulse codes into original commands, so that the second electronic component 12 is capable of recognizing and performing the original commands.

Figure 2:
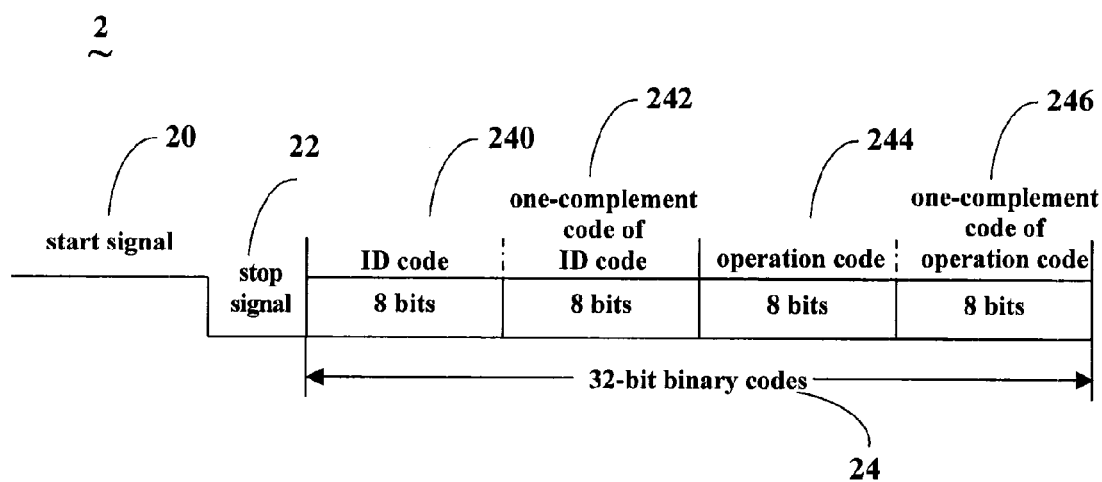
FIG. 2 is a diagram showing an exemplary structure of a pulse code sequence of the data transmission interface system of FIG. 1, the pulse code including a start signal, a stop signal, a plurality of symbols "0" and "1"

Referring to FIG. 2, an exemplary structure of a pulse code 2 corresponding a command is illustrated. The pulse code 2 includes a start signal 20, a stop signal 22, and a group of 32-bit binary codes 24. The group of 32-bit binary codes 24 includes an identification (ID) code 240 for uniquely indicating an address of the second electronic component 12 and a one-complement code of ID code 242, an operation code 244 corresponding to a command generated by the first electronic component 10, and a one-complement code of operation code 246. Both the one-complement code of ID code 242 and the one-complement code of operation code 246 are utilized for error checking so as to determine whether an error occurs during the transmission of the pulse code 2. Each one of the ID code 240, the one-complement code of the ID code 242, the operation code 244, and the one-complement code of the operation code 246 is consisted of 8-bit binary codes.

Figure 3:
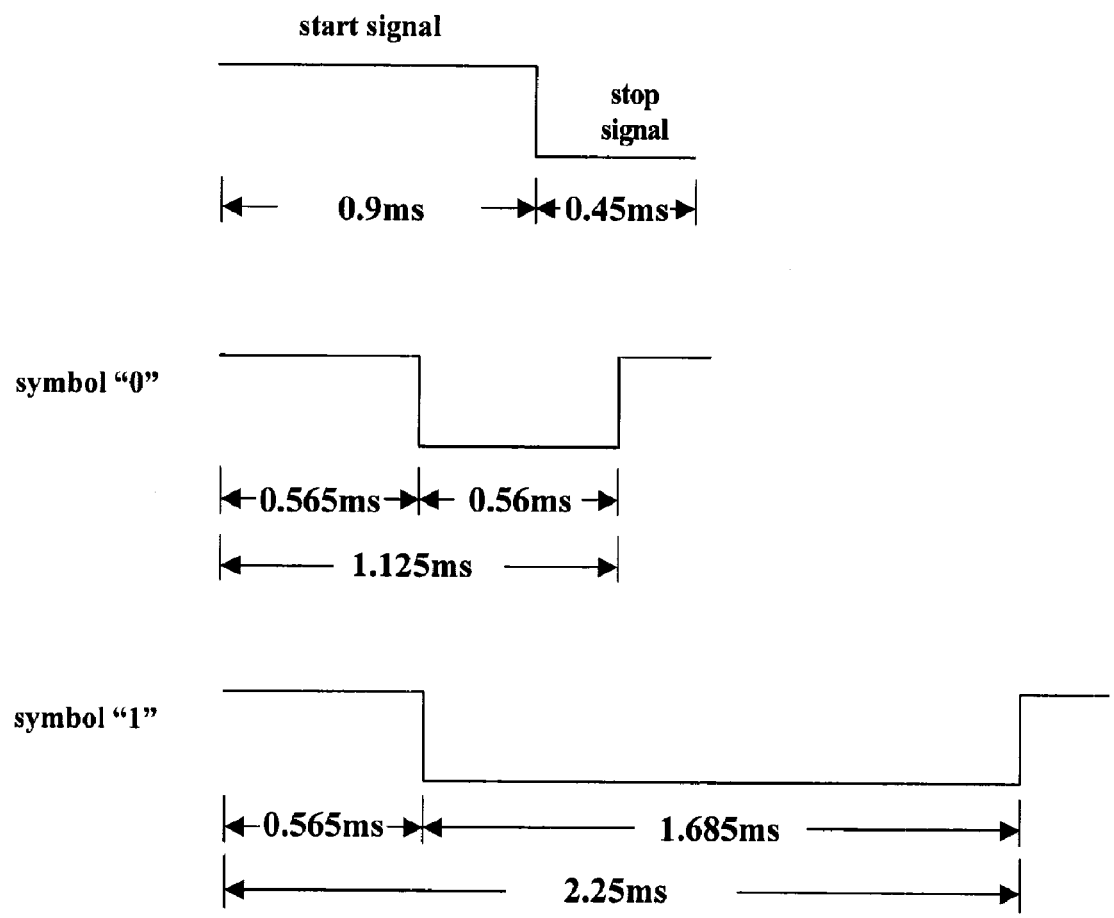
FIG. 3 is exemplary pulse diagrams of the start signal and the stop signal, the symbol "0" and the symbol "1" of the pulse code sequence of the data transmission interface system of FIG. 1.

Referring to FIG. 3, the start signal 20 is represented by a first pulse with a width of 9 ms. The stop signal 22 is represented by a second pulse with a width of 4.5 ms. The 32-bit binary codes are consisted of a plurality of symbol "0"s and symbol "1"s. The symbol "0" is represented by a third pulse with a width of 0.565 ms, an interval of 0.56 ms, and a period of 1.125 ms. The symbol "1" is represented by a forth pulse with a width of 0.565 ms, an interval of 1.685 ms, and a period of 2.25 ms.

Figure 4:
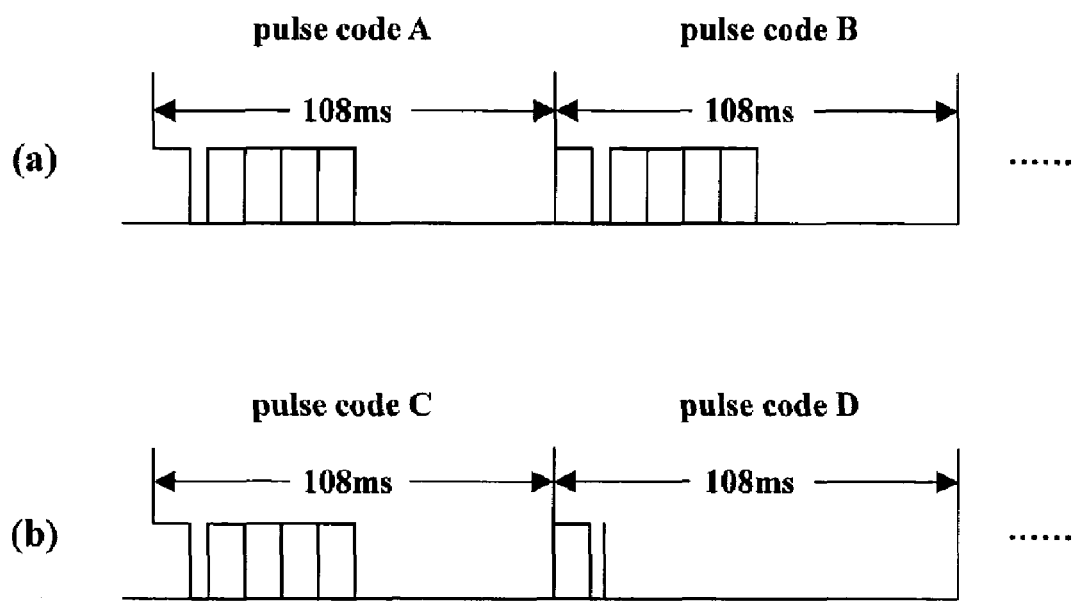
FIG. 4 is exemplary pulse diagrams of the pulse code sequences of the data transmission interface system of FIG. 1.

Referring also to FIG. 4, pulse diagrams of the pulse codes are illustrated. Each encoded code is given a predetermined transmission period of 108 ms. That is, a time period between the start signal of a first pulse code and the start signal of a second consecutive pulse code is not less than 108 ms. The diagram (a) illustrates a plurality of pulse codes sequentially including two consecutive pulse codes A and B that are respectively corresponding to two consecutive commands. The command corresponding to the pulse code A is different from that corresponding to the pulse code B. Each of pulse codes A and B includes a start signal, a stop signal and a group of 32-bit binary codes. The diagram (b) illustrates a plurality of pulse codes sequentially including two consecutive pulse codes C and D that are respectively corresponding to two consecutive and identical commands. The command corresponding to the pulse code C is identical to that corresponding to the pulse code D. The pulse code D only includes a start signal and a stop signal, and the 32-bit binary codes are omitted. When decoding, the decoding module will treat the pulse code D as the same with the pulse code C.

Figure 5:
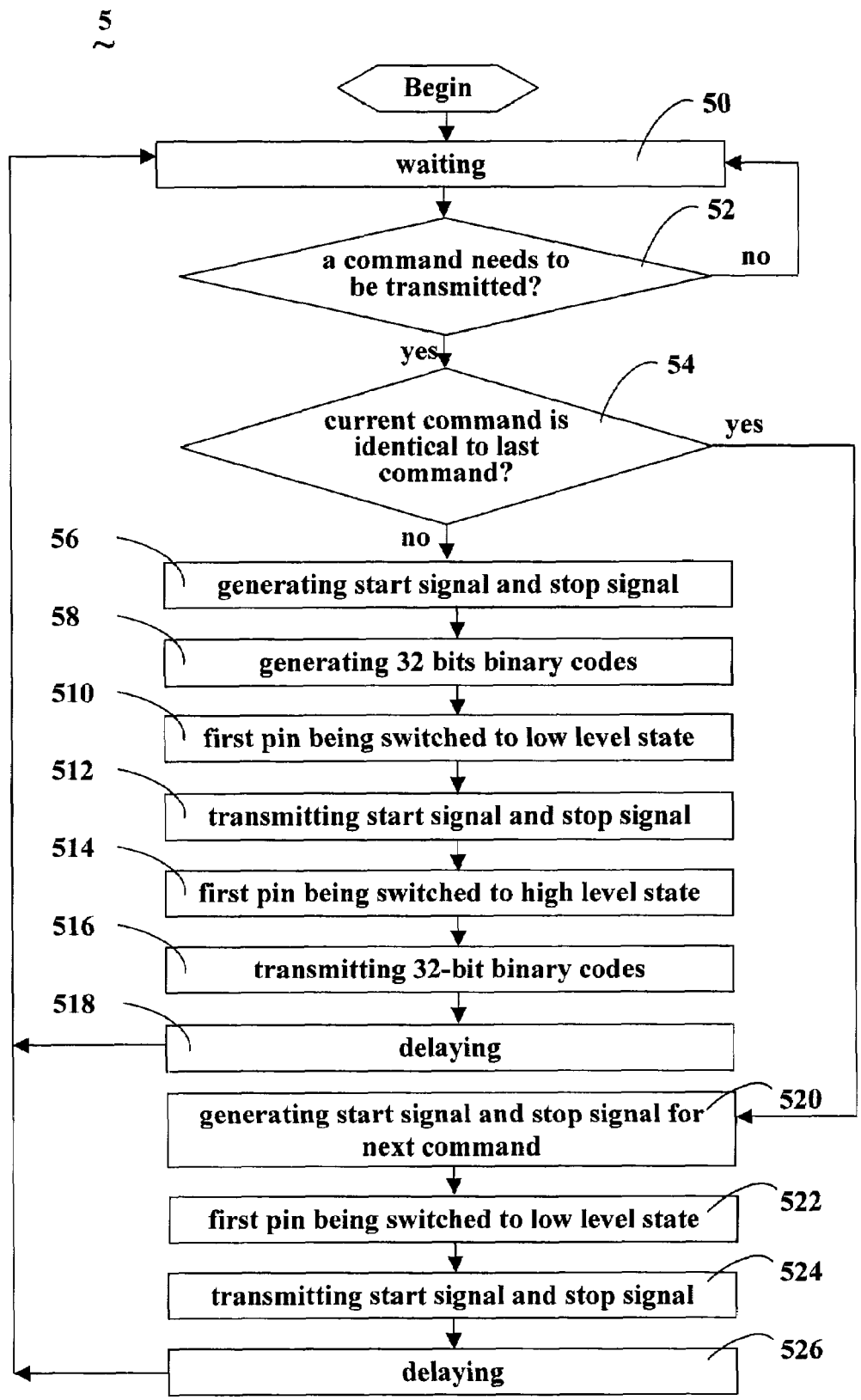
FIG. 5 is a flow chart of encoding and transmitting procedure of a data transmission interface method in accordance with a preferred embodiment.

Referring to FIG. 5, a flow chart of encoding and transmitting procedure 5 of a data transmission interface method in accordance with a preferred embodiment is illustrated. Firstly, the encoding module 100 waits for a command to be transmitted to the second electronic component 12 (step 50). At that time, the wire 14 is idle, and the first pin 102 is kept in a high level state. In step 52, the encoding module 100 determines whether a command to be transmitted to the second electronic component 12 is generated. The command to be transmitted to the second electronic component 12 is, for example, a command generated by the first electronic component 10 upon receiving an input signal on playing a predetermined song recorded on a disc from an input device. When the first electronic component 10 generates a command (hereinafter referred to a current command) that needs to be transmit to the second electronic component 12, the encoding module 100 determines whether the current command is identical to the last command that is consecutive with the current command (step 54).

If the current command is not identical to the last command, the encoding module 100 generates a start signal and a stop signal for the current command (step 56). Sequentially, in step 58, a group of 32-bit binary codes for the current command is also generated by the encoding module 100. The group of 32-bit binary codes is combined with the start signal and the stop signal to form a pulse code for the current command. Then, the first pin 102 is switched from the high level state to the low level state so as to trigger transmission of the pulse code for the current command (step 510). At that time, the wire 14 is changed to a busy state. The start signal and the stop signal are transmitted via the wire 14 (step 512). When the transmission of the start signal and the stop signal is finished, the first pin 102 is switched from the high level state to the low level state (step 514). The group of 32-bit binary codes is transmitted via the wire 14 (step 516). When the group of 32-bit binary codes is finished, a delay process is performed until a transmission period of 108 ms is terminated (step 518). That is, the wire 14 is kept in the busy state for 108 ms. During the delay process, the first pin 102 is kept in the high level state. Finally, the procedure 4 goes back to the step 40 and waits for a next command to be transmitted to the second electronic component 12.

If the current command is identical to the last command, the encoding module 100 generates a start signal and a stop signal for the current command (step 520). Then, the first pin 102 is switched from the high level state to the low level state so as to trigger transmission of the pulse code for the current command (step 522). At that time, the wire 14 is changed to the busy state. The start signal and the stop signal are transmitted via the wire 14 (step 524). When transmission of the start signal and the stop signal is finished, a delay process is performed until a transmission period of 108 ms is terminated (step 526). That is, the wire 14 is kept in the busy state for 108 ms. During the delay process, the first pin 102 is kept in the low level state until the transmission period is terminated. The first pin 102 is switched to the high level state upon the transmission period is terminated. Finally, the procedure 5 goes back to the step 50 and waits for a next command to be transmitted to the second electronic component 12.

Figure 6:
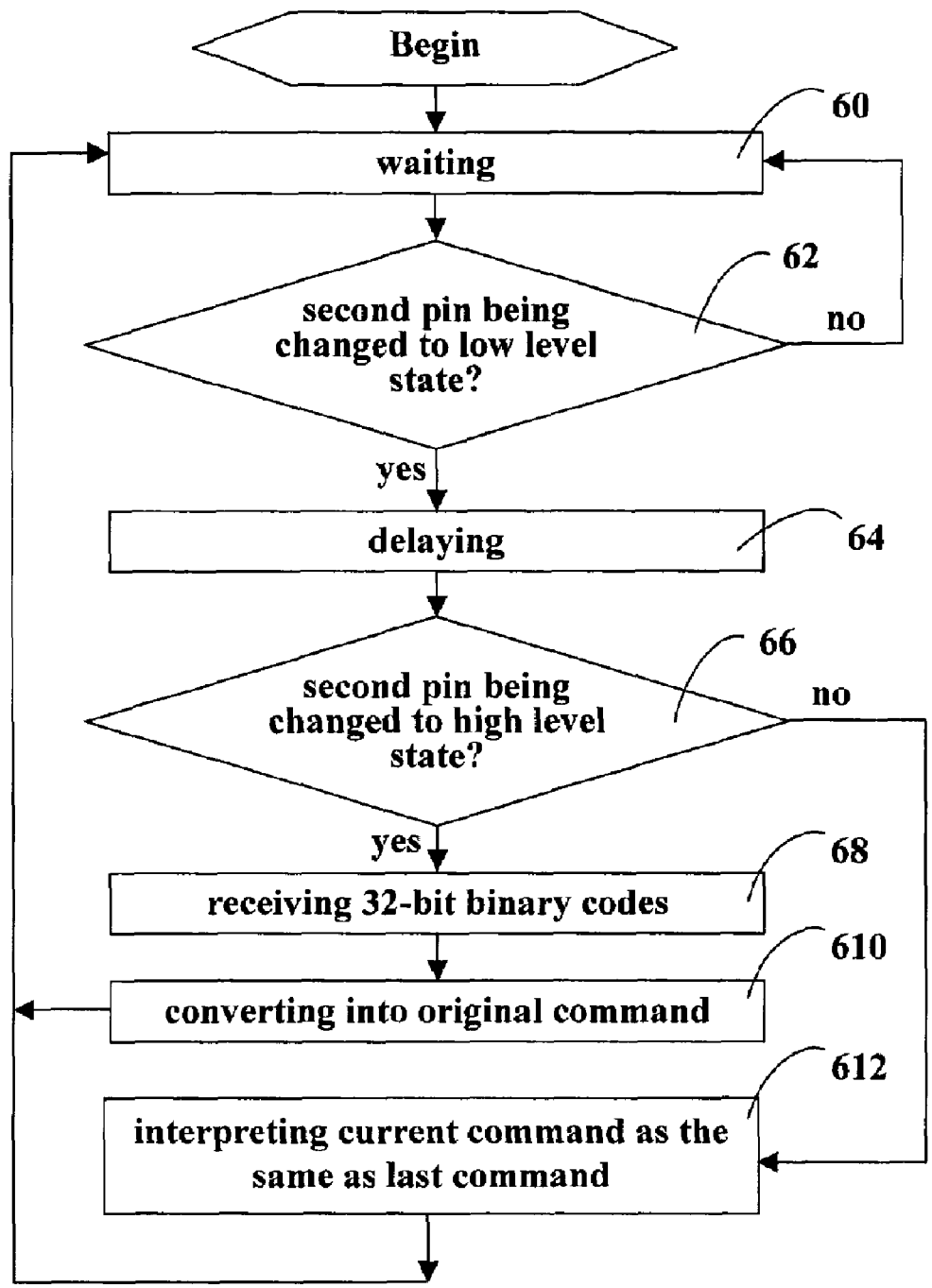
FIG. 6 is a flow chart of receiving and decoding procedure of the data transmission interface method of FIG. 4.

Referring also to FIG. 6, a flow chart of receiving and decoding procedure 6 of the data transmission interface method of FIG. 5 is illustrated. Firstly, in step 60, the second electronic component 12 waits for a switch signal of the second pin 202. In step 62, the decoding module 120 determines whether the second pin 202 is changed to the low level state. If the second pin 202 is changed to the low level state, the decoding module 120 performs a delay process until the transmission of the start signal and the stop signal is finished (step 64). When the transmission of the start signal and the stop signal is finished, the decoding module 102 determines whether the second pin 202 is changed to the high level state (step 66). If the second pin 202 is changed to the high level state, the decoding module 120 receives the group of 32-bit binary codes (step 68), and then converts the group of 32-bit binary codes into an original command (step 610). If the second pin 202 is not changed to the high level state, the decoding module 120 interprets the current command as the last command (step 612). Finally, the procedure 6 goes back to the step 60 and waits for the switch signal of the second pin 202.

It should be noted that the state of the first and second pins 102 and 202 can also be the low level state when the wire 14 is idle. In that instance, switch of the first pin 102 from the low level state to the high level state indicates that the pulse code 2 begins to transmit, and switch of the first pin 102 from the high level state to the low level state indicates that the group of 32-bit binary codes begins to transmit.

In other alternative embodiments, the first electronic component 10 and the second electronic component 12 can communicate with each other bidirectionally. In that instance, each of the first and second electronic components 10 and 12 includes an encoding module and a decoding module.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A data transmission interface system, comprising:
   a first electronic component having a first pin, comprising an encoding module for converting a command to a pulse code, the first pin being capable of switching between a high level state and a low level state;
   a second electronic component having a second pin, comprising a decoding module for converting the pulse code into the command, the second pin being in the same state as the first pin, switching of the first pin from one of the high level state and the low level state to the other one of the high level state and the low level state triggering a beginning of pulse code transmission between the first electronic component and the second electronic component; and
   a wire connecting between the first pin and the second pin, the pulse code being transmitted between the first electronic component and the second electronic component via the wire.

2. The data transmission interface system as claimed in claim 1, wherein the pulse code comprises a start signal, a stop signal, and a group of 32-bit binary signal consisted of a plurality of symbol "1"s and "0"s.

3. The data transmission interface system as claimed in claim 2, wherein the group of 32-bit binary signal comprises an 8-bit identification code indicating an address of that serves as a receiver, an 8-bit one-complement code of the identification code, an 8-bit operation code, and an 8-bit one-complement code of the operation code.

4. The data transmission interface system as claimed in claim 2, wherein the start signal is represented by a pulse with a width of 9 ms, the stop signal is represented by a pulse with a width of 4.5 ms, the symbol "1" is represented by a pulse with a width of 0.565 ms, an interval of 1.685 ms, and a period of 2.25 ms, and the symbol "0" is represented by a pulse with a width of 0.565 ms, an interval of 0.56 ms, and a period of 1.125 ms.

5. The data transmission interface system as claimed in claim 2, wherein the first pin is switched from said other one of the high level state and the low level state to said one of the high level state and the low level state when the start signal and the stop signal finish transmitting so as to trigger transmission of the group of 32-bit binary codes.

6. A data transmission interface method used for data transmission between a first electronic component having a first pin and a second electronic component having a second pin electronically connected with the first pin via a wire, the data transmission interface method comprising:
   one of the first electronic component and the second electronic component generating a command;
   converting the command into a pulse code;
   switching the first pin from a first state to a second state; and
   said one of first electronic component and the second electronic component transmitting the pulse code via the wire to the other one of the first electronic component and the second electronic component.

7. The data transmission interface method as claimed in claim 6, further comprising:
   switching the second pin from the first state to the second state upon the first pin switching from the first state to the second state; and
   the second electronic component receiving and decoding the pulse code.

8. The data transmission interface method as claimed in claim 6, wherein the pulse code is consisted of a start signal, a stop signal and a group of 32-bit binary codes consisted of a plurality of symbol "1"s and "0"s.

9. The data transmission interface method as claimed in claim 8, wherein the group of 32-bit binary signal comprises an 8-bit identification code indicating an address of that serves as a receiver, an 8-bit one-complement code of the identification code, an 8-bit operation code, and an 8-bit one-complement code of the operation code.

10. The data transmission interface method as claimed in claim 9, wherein the start signal is represented by a pulse with a width of 9 ms, the stop signal is represented by a pulse with a width of 4.5 ms, the symbol "1" is represented by a pulse with a width of 0.565 ms, an interval of 1.685 ms, and a period of 2.25 ms, and the symbol "0" is represented by a pulse with a width of 0.565 ms, an interval of 0.56 ms, and a period of 1.125 ms.

11. The data transmission interface method as claimed in claim 10, further comprising:
   transmitting the start signal and the stop signal when the first pin being switched from the first state to the second state;
   switching the first pin from the second state to the first state;
   transmitting the group of 32-bit binary codes to the other one of the first electronic component and the second electronic component; and
   delaying for a predetermined time.

12. The data transmission interface method as claimed in claim 11, further comprising:
   delaying until the transmission of the start signal and the stop signal being finished;
   switching the second pin from the second state to the first state upon the first pin being switched to the first state; and
   receiving and decoding the group of 32-bit binary codes.

13. The data transmission interface method as claimed in claim 11, wherein the first state is one of a high level state and a low level state, and the second state is the other one of the high level state and the low level state.

14. A data transmission interface method used for data transmission between a first electronic component having a first pin and a second electronic component having a second pin electronically connected with the first pin via a wire, the data transmission interface method comprising:

one of the first electronic component and the second electronic component generating a command being consecutive with a last command by time sequence;
determining whether the command is identical to the last command;
converting the command into a pulse code consisted of a start signal, a stop signal, and a group of 32-bit binary codes, if the command is not identical to the last command;
switching the first pin from a first state to a second state;
transmitting the start signal and the stop signal;
switching the first pin from the second state to the first state; and
transmitting the group of 32-bit binary codes to the other one of the first electronic component and the second electronic component.

15. The data transmission interface method as claimed in claim 14, further comprising:
converting the command into a pulse code consisted of a start signal and a stop signal, if the command is identical to the last command;
switching the first pin from the first state to the second state; and
transmitting the start signal and the stop signal.

16. The data transmission interface method as claimed in claim 14, further comprising a step of:
delaying a predetermined time after the pulse code is finished transmitting before transmission of a next command.

17. The data transmission interface method as claimed in claim 14, further comprising:
the other one of the first electronic component and the second electronic component delaying when the first pin being switched from the first state to the second state, until the start signal and the stop signal being finished transmitting;
determining whether the first pin is switched from the second state to the first state when the start signal and the stop signal is finished transmitting; and
receiving and decoding the group of 32-bit binary codes, if the first pin is switched from the second state to the first state.

18. The data transmission interface method as claimed in claim 14, further comprising a step of:
converting the pulse code into a same command as the last command.

* * * * *